United States Patent [19]

Shaw

[11] Patent Number: 4,703,868
[45] Date of Patent: Nov. 3, 1987

[54] APPARATUS FOR METERING AND DISPENSING SEEDS

[75] Inventor: Lawrance N. Shaw, Gainesville, Fla.

[73] Assignee: University of Florida, Gainesville, Fla.

[21] Appl. No.: 812,020

[22] Filed: Dec. 23, 1985

[51] Int. Cl.[4] ............................................... A01C 7/04
[52] U.S. Cl. .................................... 221/211; 221/278; 111/7; 406/68; 222/216; 222/225; 222/630
[58] Field of Search ................ 221/211, 278; 111/6-7, 111/34, 77; 406/67-68; 222/368, 630, 216, 225, 221; 414/223, 225; 198/392, 443, 803.16, 803.5, 471.1

[56] References Cited

U.S. PATENT DOCUMENTS

| | | | |
|---|---|---|---|
| 1,501,297 | 7/1924 | Anderson | 222/216 |
| 1,854,148 | 4/1932 | Hunter | 222/636 X |
| 3,204,045 | 12/1966 | Kelley et al. | 111/1 |
| 3,387,746 | 6/1968 | Whipple | 221/211 |
| 3,627,173 | 12/1971 | Kerker | 221/211 |
| 3,648,631 | 3/1972 | Fiedler et al. | 111/6 |
| 3,750,832 | 8/1973 | Ovarnstrom | 221/211 |
| 4,181,241 | 1/1980 | Currah | 111/7 X |

FOREIGN PATENT DOCUMENTS

| | | | |
|---|---|---|---|
| 1223812 | 9/1966 | Fed. Rep. of Germany | 222/368 |
| 2848057 | 5/1980 | Fed. Rep. of Germany | |
| 224753 | 7/1985 | German Democratic Rep. | 221/211 |
| 1553832 | 10/1979 | United Kingdom | |
| 575060 | 10/1977 | U.S.S.R. | 111/7 |
| 676206 | 8/1979 | U.S.S.R. | 221/278 |
| 1165255 | 7/1985 | U.S.S.R. | 221/211 |

OTHER PUBLICATIONS

U.S.S.R. Abstract 575,060, 10-1977.

Primary Examiner—Charles A. Marmor
Attorney, Agent, or Firm—Dennis P. Clarke

[57] ABSTRACT

Apparatus for metering and dispensing seeds from a liquid or gel suspension of seeds includes a rotor having a plurality of orifices disposed within concave-shaped recesses about the peripheral surface of the rotor, each recess communicating with a bore of the rotor by a passageway. The rotor is supported within a recess in a housing by a stationary pintle having circumferentially extending grooves which are aligned with the radial passageways in the rotor, the grooves being connected to a pressure source and to a suction source so as to enable a suction to be applied to orifices located at a first region of the housing and a pressure to be applied to orifices located at a second region of the housing. The orifices located at the first region are exposed to the seed suspension, and the suction causes a seed from the suspension to be drawn to and held on the peripheral surface. The orifices located at the second region are adjacent to a transfer fluid passageway through the housing which communicates with the peripheral surface of the rotor at the second region, and the pressure causes the seeds carried by the rotor to be ejected into the transfer fluid flow. The apparatus enables sprouted seeds to be handled without damage and affords a uniform distribution of seeds in the transfer fluid, thereby promoting uniform planting of seeds.

18 Claims, 8 Drawing Figures

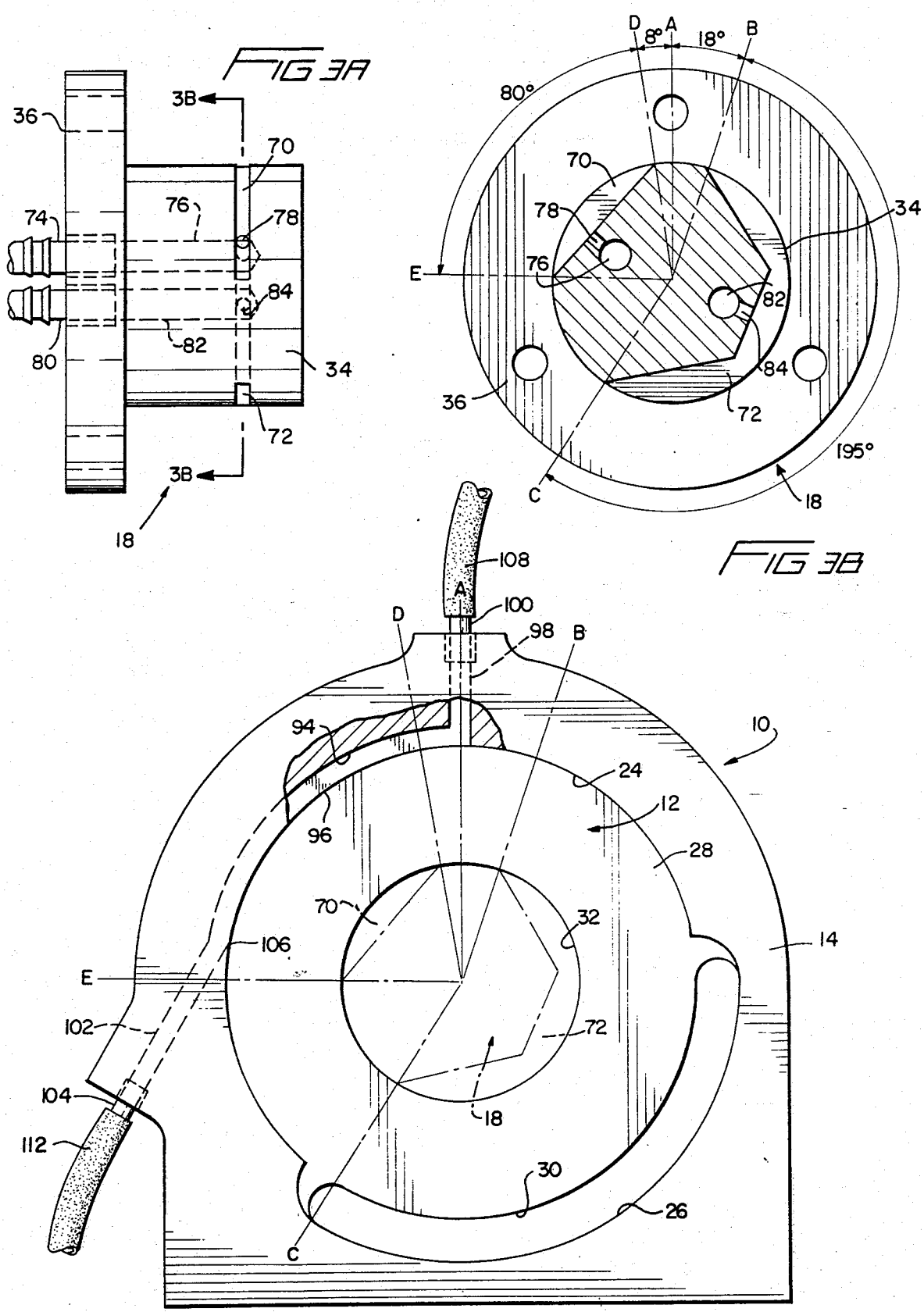

APPARATUS FOR METERING AND DISPENSING SEEDS

BACKGROUND OF THE INVENTION

The present invention relates generally to agricultural apparatus, and more particularly to apparatus for singling out individual seeds from a liquid or gelatinous suspension of seeds and for reintroducing the selected seeds uniformly spaced into a stream of a carrier fluid.

There are significant advantages to planting crops with pregerminated or sprouted seeds. In addition to reduced crop emergence time, this practice enables the germination of seeds in a more ideal environment than that frequently found in the soil and the planting of only viable seeds, which increases crop uniformity and improves crop quality and yield. Moreover, germination may be initiated before the time the seeds can ordinarily be planted. This enables the crop growing season to be shortened, which reduces field crop risks and allows earlier marketing for better prices.

Pregerminated seeds tend to be more fragile than seeds which have not sprouted, and sprouted seeds must be handled more carefully to minimize damage to them. Accordingly, many sprouted seeds are put into the ground manually or using a hand-feed planting machine. The handling and planting of sprouted seeds may be facilitated by dispersing the seeds in a fluid, such as a gelatinous material, which protects the seed radicals and serves as a carrier for dispersing the seeds into the soil. Since it is desirable to plant seeds regularly spaced in rows or in uniform volumes as for clump planting of seeds, attempts have been made to mix the seeds uniformly in the gelatinous carrier vehicle and to disperse the mixture regularly in drilled rows or in uniform volumes using a planting machine. Such techniques have not been satisfactory for providing a uniform spacing of seeds in a row or for providing uniform numbers of clumped seeds. This has been due in part to the difficulty in achieving a uniform distribution of the seeds in the gelatinous carrier vehicle.

It is desirable to provide apparatus in which such disadvantages are avoided and which enables the dispersion of seeds into a carrier or transfer fluid in a controlled manner, and it is to this end that the present invention is directed.

SUMMARY OF THE INVENTION

The invention affords seed metering and dispensing apparatus which is capable of gently picking or singling out individual seeds from a suspension of seeds in a fluid such as a gel or a liquid, and which is capable of reintroducing the selected seeds in a controlled manner into a separate continuous stream of a carrier or a transfer fluid. Apparatus in accordance with the invention has a rather simple construction and enables the dispensing of seeds into the transfer fluid to be easily metered and controlled. The apparatus handles the seeds gently, thereby minimizing damage to them, and may be used with pregerminated or non-germinated seeds. Furthermore, the apparatus is readily adaptable for use with seeds of different sizes, and may employ a gel, water, or some other fluid as a carrier vehicle.

Briefly stated, in accordance with one aspect, the invention may comprise a housing which is adapted to be disposed within a fluid suspension of seeds, the housing having a surface defining a recess within the housing and having a passageway through the housing which is in communication with the recess. Means is included for providing a transfer fluid flow through the passageway in the housing. A disk having a plurality of orifices disposed about its peripheral circumferential surface is rotatably supported within the recess. Each orifice is connected to a passageway within the disk, and means is included for rotating the disk within the recess. The recess is formed such that the peripheral surface of the disk is exposed to the seed suspension at a first region and such that the housing surface which defines the recess closely conforms to the peripheral surface of the disk at a second region. Means is further included for applying a suction to orifices located at the first region so as to cause a seed from the suspension to be drawn to and held on the peripheral surface of the rotating disk at each such orifice; and means is included for applying a pressure to the orifices located at the second region in order to eject the seeds from the peripheral surface into the transfer fluid flow.

In another aspect, the apparatus may comprise a rotor adopted to be disposed within a fluid suspension of seeds, the rotor having a plurality of orifices spaced about its periphery, and means for rotating the rotor. Means is included for applying a suction to orifices at a first region within the seed suspension to cause a seed to be drawn to and held on the peripheral surface of the rotor at each orifice. A hollow follower member is biased into engagement with the peripheral surface of the rotor at a second region. Means is included for providing a transfer fluid flow which contacts the periphery of the rotor at the second region and which flows outwardly from the rotor through the hollow follower member; and means is included for applying a pressure to the orifices at the second region in order to eject seeds into the transfer fluid flow.

In a preferred form, the suction and pressure applying means may comprise a pintle which rotatably supports the disk or rotor and which has formed in its surface circumferentially extending first and second grooves which are connected by passageways in the pintle to a pressure source and to a suction source, respectively. The grooves in the pintle communicate with the orifices by means of radial passageways which connect each orifice to a port in the bore of the disk or rotor that receives the pintle, and serve to alternatively apply a suction or a pressure to each orifice during a certain portion of the rotation. The follower member acts as a sliding seal at the surface of the disk or rotor and serves to minimize the amount of transfer fluid carried by the disk or rotor into the seed suspension. The follower also assists in scooping the seeds into the transfer fluid flow from the surface of the disk or rotor, thereby ensuring transfer of the seeds to the transfer fluid and promoting a more uniform distribution of seeds in the transfer fluid.

Other more specific aspects will become apparent from the description which follows.

BRIEF DESCRIPTION OF THE DRAWINGS

FIGS. 3A–B are, respectively, a side view of a pintle of the apparatus of FIG. 1 and a cross-sectional view taken approximately along the line 3B—3B of FIG. 3A;

FIG. 4 is a plan view, partially broken away, of the housing of the apparatus.

DESCRIPTION OF THE PREFERRED EMBODIMENTS

The invention is especially suited for use with agricultural planting machines for controlling the dispersion of seeds in a transfer fluid which carries the seeds to the soil, and will be described in that environment. As will be appreciated, however, this is illustrative of only one utility of the invention.

Figure 1:
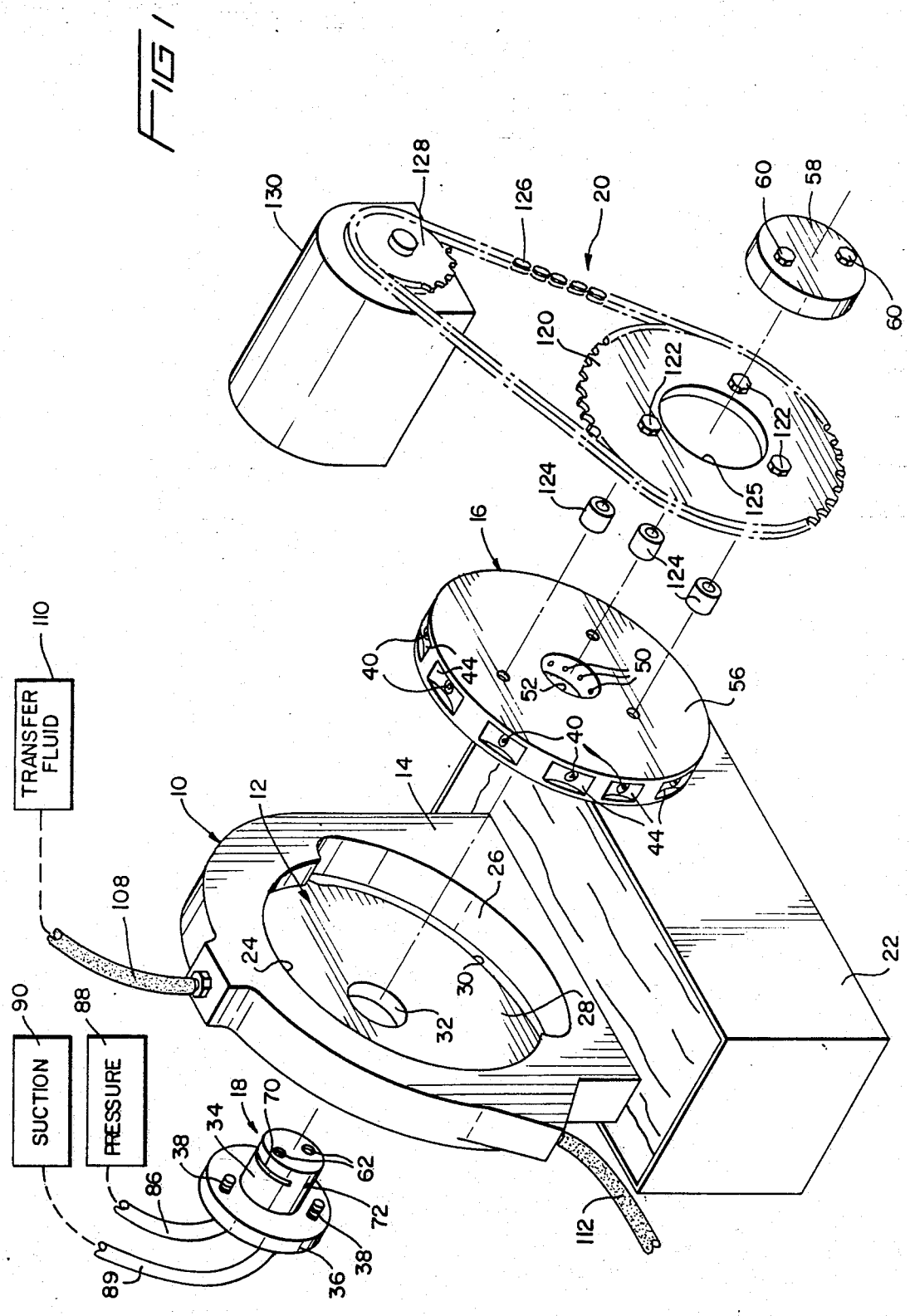
FIG. 1 is an exploded perspective view of seed metering and dispensing apparatus in accordance with the invention.

FIG. 1 is an exploded perspective view of a first embodiment of apparatus in accordance with the invention. As shown in the Figure, and as will be described in more detail hereinafter, the apparatus may comprise a generally planer housing 10 having a recess 12 therein which is open to one side 14 of the housing, a rotor 16 disposed within the recess on a stationary hub or pintle 18 and a drive mechanism 20 for rotating the rotor. The housing is adapted to be disposed in a substantially vertical plane at least partially submerged in a fluid suspension of seeds in a container 22 of an automatic planting machine such as a seed drill or the like. As the rotor rotates within the housing, it picks up seeds from the fluid suspension and deposits the seeds into a stream of a transfer fluid flowing through the housing. The planting machine (not illustrated) may include conventional devices for opening the soil and means for dispensing the transfer fluid containing the seeds into the ground.

In more detail, as shown in FIGS. 1 and 4, recess 12 may have a first generally cylindrical upper portion 24 which presents a circular opening having a first radius in the sidewall 14 of the housing and may have a second lower portion 26 which is also circular but has a somewhat greater radius. The upper portion of the recess may extend from the sidewall surface 14 approximately three-fourths of the way through the housing to a rear wall 28 of the housing. The rear wall may have an arcuate slot 30 cut therethrough, as shown, so that the lower portion of the recess extends completely through the housing. As will be explained hereinafter, the lower portion 26 of the recess and slot 30 enable the fluid suspension of seeds to flow through the housing adjacent to the peripheral circumferential surface of the rotor and constitute a pick-up region of the apparatus where the seeds may be picked up by the rotor and carried to a transfer region adjacent to the upper portion of the recess where they may be transfered to a stream of transfer fluid flowing through the housing. As indicated in FIG. 4, portion 26 of the recess and slot 30 may comprise approximately one-third, e.g., 120° of arc, of the circumference of the opening in the sidewall, and the upper portion 24 of the recess may comprise the remaining two-thirds of the opening.

Rear wall 28 of the housing may have a circular opening 32 therethrough which is centered with respect to the upper portion 24 of the recess to enable a cylindrical portion 34 of the pintle to be received within the housing. As shown in FIGS. 1 and 3A–B, the pintle may have a rear flange 36 to enable the pintle to be secured to the rear wall 28 of the housing, as by bolts 38 threaded into the rear wall. Upon the pintle being secured to the rear wall, its cylindrical portion 34 projects into the recess and serves as a stationary hub for rotatably supporting rotor 16 within the recess.

Figure 2A:
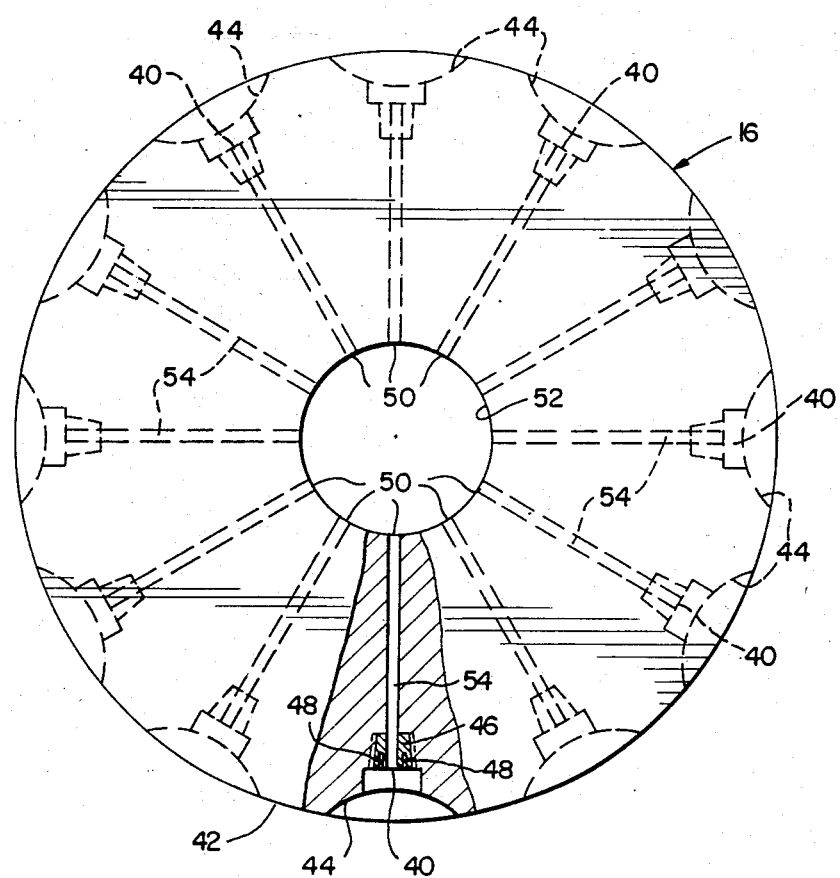
FIGS. 2A-C are, respectively, a plan view, partially broken away, of a rotor of the apparatus of FIG. 1, an end view of the rotor, and an enlarged plan view of an orifice in the peripheral surface of the rotor.
Figure 2B:
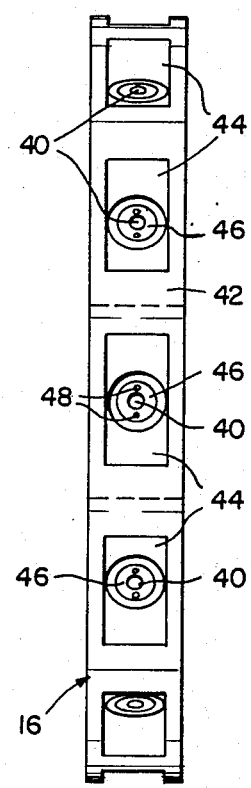
Figure 2C:
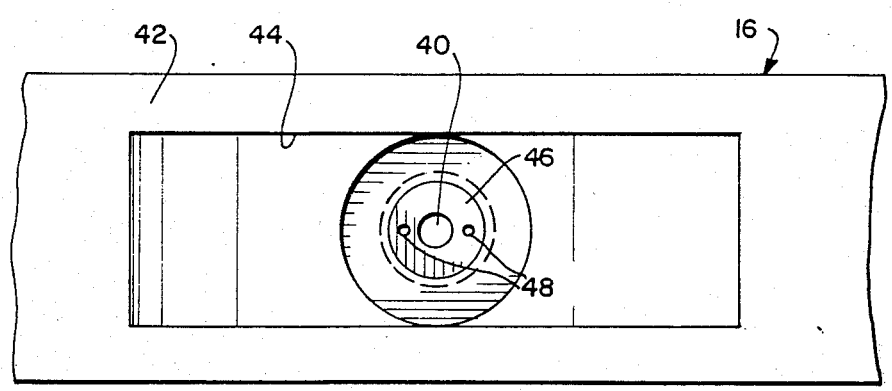

As shown in FIGS. 1 and 2A–C, rotor 16 may comprise a disk having a plurality of orifices 40 regularly spaced about the periphery of its circumferential surface 42. Each orifice may be located within a generally concave-shaped recess 44 formed in the peripheral surface of the rotor, and is preferably constituted by an opening extending through a member 46 which is threaded into the rotor. Member 46 may comprise, for example, a standard ⅛ inch NPT threaded plug, as of brass, having a hole bored therethrough. The plug is preferably removable and, as best shown in FIG. 2C, its upper surface may be formed with a pair of offset blind holes 48 for receiving the prongs of a U-shaped tool (not illustrated) for threading the plug into and out of the rotor. The use of a removable plug is desirable since it enables the size of the orifice to be changed conveniently to accommodate different size seeds, as will be explained shortly. As also shown in FIGS. 1 and 2A, each orifice 40 may communicate with a corresponding opening or port 50 formed in a centrally located bore 52 of the rotor by means of a radially extending passageway 54, for a purpose which will also be explained shortly.

Bore 52 of the rotor is sized to have a diameter which is slightly greater (by a few thousandths of an inch, for example) than the diameter of cylindrical portion 34 of the pintle so that the rotor may rotate freely on the pintle and so that the surface of the bore conforms closely to the surface of the pintle. The rotor may have a thickness substantially equal to the depth of the recess portion 24 in the housing so that its outer surface 56 lies in substantially the same plane as the sidewall surface 14 of the housing. The rotor may further have a radius substantially equal to the radius of recess portion 24 so that its peripheral surface 42 closely conforms to the cylindrical surface of the recess portion 24 with a small clearance sufficient to enable the rotor to rotate freely. An end cap 58 mounted on the end of the pintle, as by bolts 60 threaded into corresponding openings 62 in the pintle, may confine the rotor axially on the pintle.

As shown in FIGS. 1 and 3A–B, cylindrical portion 34 of the pintle may be formed with a pair of circumferentially extending sectional grooves 70 and 72. These grooves are positioned in the pintle so as to be in alignment with openings 50 in the bore of the rotor when the rotor is mounted on the pintle. As shown, groove 70 may communicate with a port 74 on the rear flange 36 of the pintle by means of an axially extending passageway 76 and a radially extending passageway 78 which connects the groove and passageway 76. Similarly, groove 72 may communicate with another port 80 on the rear flange by means of an axial passageway 82 and a radial passageway 84. As shown in FIG. 1, port 74 may be connected by means of a line 86 to a positive pressure source 88, and port 80 may be connected via a line 89 to a negative pressure or suction source 90. The pressure and suction sources may comprise a single peristaltic pump, for example. The arrangement of passageways and grooves in the pintle enables a suction to be applied to those of the orifices 40 having their corresponding ports 50 in the rotor bore 52 aligned with groove 72 of the pintle, and enables a pressure to be applied to the orifices whose ports 50 are aligned with groove 70. Thus, as the rotor rotates on the pintle, a suction is applied to an orifice during a first part of the rotation of the rotor and a pressure is applied to the orifice during another part of the rotation.

As shown in FIG. 3B, suction groove 72 may be formed to subtend an arc of approximately 195° which extends between the lines B and C, and pressure groove 70 may be formed to subtend an arc of approximately 80° which extends between the lines D and E. Line B may be located approximately 18° clockwise from a vertical line A and line D may be located approximately 8° counterclockwise from the vertical line. FIG. 4 illustrates in phantom lines the preferred orientation of the pintle and grooves 70 and 72 relative to the housing, and illustrates the locations of the lines A–E relative to the housing.

As is also shown in FIG. 4, a groove 94 may be formed in a portion of the interior cylindrical surface 96 of the housing which constitutes recess portion 24. Groove 94 may be connected by means of a vertical passageway 98 to the top of the housing and to an inlet port 100 and may be connected by means of another passageway 102 to an outlet port 104 at the left side of the housing. As shown, groove 94 is open to and communicates with recess portion 24 between the vertical line A and a point 106 at which it intersects with passageway 102. Inlet port 100 may be connected via a line 108 to a transfer fluid source 110 (see FIG. 1), and outlet port 104 may be connected by a line 112 to a device (not illustrated) on the planting machine which deposits seeds into the ground. Groove 94 and passageways 98 and 102 enable a stream of a transfer or carrier fluid to flow from source 110 through the housing. As shown by the positions of the lines B, C, D, and E in FIG. 4, suction groove 72 of the pintle enables suction to be applied to orifices 40 in the rotor which are adjacent to slot 30 and recess 26, and enables pressure to be applied to the orifices which are adjacent to groove 94 in the housing. As previously indicated, the region adjacent to slot 30 is a pick-up zone where seeds are drawn to and held on the periphery of the rotor. The region adjacent to groove 94 is a transfer zone where the seeds are transferred to the transfer or carrier fluid flowing through the housing.

In operation, the apparatus may be submerged at least partially in a gel or liquid containing seeds in suspension. A suitable gel for the seed suspension is Viterra-2 manufactured by Union Carbide. This gel has a consistency similar to that of applesauce. The transfer fluid may be a similar gel or may be another liquid. Other liquids which may be used include water. The rotor is rotated counterclockwise by drive arrangement 20, which may comprise a sprocket gear 120 attached to the surface of the rotor by means of bolts 122 and spacer bushings 124. The sprocket gear may have a central opening 125 with a diameter greater than the diameter of end cap 58, and may be coupled by a chain 126 and another sprocket gear 128 to a drive device 130 which is preferably formed to enable the rotational speed of the rotor to be varied. Drive device 130 may comprise, for example, a motor, a gear box which is driven by a gauge wheel or the like (not illustrated) of the planting machine which engages the ground so that the rotation of the rotor may be synchronized to the speed of the planting machine. As the rotor rotates through the pick-up zone corresponding to recess portion 26 and slot 30, the suction causes seeds to be attracted to and held on the rotor periphery at each orifice. As noted above, the larger diameter of recess portion 26 exposes the peripheral surface of the rotor to the seeds suspension, and slot 30 through the housing enables a flow of the seed suspension past the rotor surface to be maintained, which facilitates capture of the seeds by the orifices. The orifices in the rotor are sized according to the type of seed being planted and such that a single seed will be held on the rotor at each orifice. The orifice diameter may vary between 0.125 inch and 0.0135 inch, for example, depending upon the size of the seeds being planted. The use of replacable plugs 46 for the orifices as previously described facilitates changing of the orifice size to accommodate different size seeds.

Referring to FIG. 4, with the rotor rotating counterclockwise, suction is applied to an orifice as it enters the pick-up zone at line C. Suction is maintained throughout the pick-up zone and until the orifice reaches the line B just prior to where the transfer fluid enters the housing via passageway 98. The concave recesses 44 in which each orifice is disposed enable the seeds to be carried by the rotor without damage past the cylindrical surface 96 of recess portion 24, and maintaining suction until an orifice approaches closely to the transfer region helps to minimize any damage to the seeds which could be caused by the seeds scraping on the surface of the recess. When the orifice reaches the position indicated by line D, at which it is beyond passageway 98 and adjacent to the transfer fluid stream flowing through groove 94, the positive pressure applied to the orifice via pressure groove 70 of the pintle causes the seed in concave recess 44 to be ejected into the transfer fluid stream. The stream carries the seeds out of the housing via line 112 to a seed drill or the like for placing the seeds into the ground. The positive pressure is maintained until the orifice reaches line E, which is beyond the point where the transfer fluid is in contact with the peripheral surface, to ensure that the seed does not drop back into the concave recess but is carried out of the housing in the transfer fluid. This also minimizes somewhat the amount of transfer fluid which is carried by the rotor back to the seed suspension, which may be desirable.

The invention can gently pick or single out individual seeds from the suspension, thereby making it especially suited for handling very fragile or sprouted seeds, and can dispense the seeds uniformly and regularly spaced into the transfer fluid, thereby enabling uniform placement of the seeds into the ground. The spacing of the seeds in the transfer fluid may be varied by changing the relative velocities of the rotor and the transfer fluid, as by varying the rotor speed, for example. For the embodiment illustrated in the figures, which employs a rotor having twelve orifices spaced about its periphery, it has been found that a seed dispensing rate of the order of one seed per second, which corresponds to a disk rotation of about eight seconds per revolution, works well. If the velocity of the orifices through the seed suspension is too high, some orifices may not pick up seeds and, accordingly, the spacing of the seeds in the transfer fluid would not be uniform. For the embodiment illustrated, it has been found that the maximum rotational speed at which uniform distribution of the seeds in the transfer fluid occurs corresponds to a seed delivery rate of the order of 0.75 seconds per seed. In order to increase the capacity and delivery rate, the number of orifices about the periphery of the rotor may be increased to twenty-four, for example, or two rows of orifices side-by-side may be provided on the rotor. Also, two or more rotors placed side-by-side could be employed, which would enable planting of seeds in parallel rows.

Figure 5:
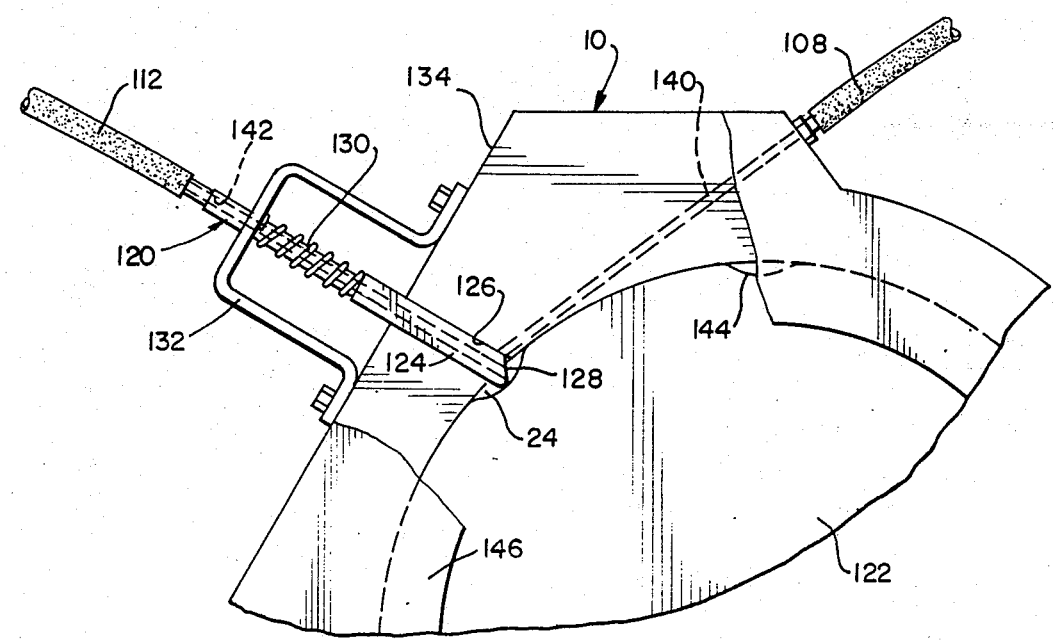
FIG. 5 is a plan view of a portion of an alternative embodiment of the invention.

FIG. 5 illustrates a modified form of the invention. The modifications relate principally to the incorporation into the housing of a slipper seal 120 which bears against the peripheral surface of the rotor 122 and acts like a cam follower. As shown, the slipper seal may comprise an elongated hollow member, one portion 124 of which has a rectangular or square cross section and is slidingly disposed within a correspondingly shaped groove 126 in the housing sidewall. The end 128 of the slipper seal adjacent to the rotor may be angled, as shown, and may be biased into engagement with the rotor by means of a spring 130 which acts between portion 124 and a bracket 132 which is mounted on the exterior surface 134 of the housing.

FIG. 5 also illustrates a somewhat different transfer fluid path through the housing than that employed by the first embodiment. As shown, the transfer fluid path 140 may comprise a generally straight path which intersects recess 24 adjacent to groove 126 for the slipper seal. Transfer fluid enters the housing via line 108, travels through path 140, to the recess and the surface of the rotor, and then exits the housing through the hollow bore 142 of the slipper seal and flows through line 112. If desired, the grooves in the pintle may be formed so that pressure is not applied to the orifices in the rotor until they approach the slipper seal. Although this transfer fluid arrangement has been found to be satisfactory, an arrangement similar to that illustrated in FIG. 4 employing a groove which communicates with the periphery of the rotor over a portion thereof may be employed instead of the illustrated arrangement. In addition, rotor 122 may be formed, as shown in FIG. 5, with concave recess 144 in its periphery which extend through the thickness of the rotor and are open at the sides thereof, and an annular plate 146 applied to the sidewall of the housing may be employed to confine the seeds within the recesses in the rotor. The plate also serves to prevent the transfer fluid from flowing outwardly to the side of the rotor rather than through bore 142 in the slipper seal.

In operation, as the rotor is rotated counterclockwise within the housing, end 128 of the slipper seal bears against the rotor periphery. This provides a sliding seal between the rotor periphery and the housing which prevents transfer fluid from being carried on the rotor periphery beyond the slipper seal and into the seed suspension reservoir. This enables a transfer fluid, such as water, which is different from the fluid in which the seeds are suspended to be employed without fear of the transfer fluid being carried by the rotor periphery to the seed suspension reservoir. As a concave recess 144 of the rotor moves adjacent to the slipper seal, spring 130 causes end 128 of the slipper seal to follow the contour of the recess. Transfer fluid flows into recess 144 from passageway 140 and out of the housing through bore 142 of the slipper seal and line 112, carrying with it the seed from the recess. In addition to providing a seal, end 128 of the slipper seal acts somewhat like a scoop to assist in removing the seed from recess 144 and helps insure that the seed is injected into the transfer fluid flow. This has been found to contribute to the more uniform spacing of the seeds in the transfer fluid leaving the housing.

The embodiment of FIG. 5 may be oriented vertically in the seed suspension reservoir, as described for the first embodiment, or may be disposed horizontally completely submerged in the reservoir. The embodiment of FIG. 5 has been tested using sprouted tomato seeds and agitation of the seed suspension, and found to afford single seed selection approximately 79% of the time with approximately 3.5% skips. This results in the distribution of seeds in the transfer fluid being quite uniform, and, accordingly, enables the seeds to be placed uniformly into the ground.

The invention may be constructed from a number of different materials. In a preferred form, the housing is aluminum, the pintle is brass, and the rotor is of acetal plastic. If desired, the housing and the pintle could be formed of plastic as well.

While preferred embodiments of the invention have been shown and described, it will be apparent to those skilled in the art that changes may be made in these embodiments without departing from the principles and spirit of the invention, the scope of which is defined in the appended claims.

What is claimed is:

1. Apparatus for metering and dispensing seeds from a fluid suspension of seeds, comprising a housing adapted to be disposed within the fluid suspension, the housing having a surface defining a housing recess within the housing and having a passageway therethrough, the passageway communicating with the surface; means for providing a flow of a transfer fluid through the passageway; a disk rotatably supported within the housing recess, the disk having a plurality of orifices disposed about a circumferential peripheral surface thereof, each orifice being disposed within a corresponding shallow recess in the peripheral surface and communicating with a corresponding passageway in the disk, and the housing recess being formed such that the peripheral surface of the disk is exposed to the seed suspension at a first region and such that the housing surface closely conforms to the peripheral surface of the disk at a second region, the transfer fluid passageway communicating with the peripheral surface within said seond region; means for rotating the disk; means for applying a suction to orifices located at the first region so as to cause a seed from said suspension to be drawn to and held on the peripheral surface of the disk at such orifices; means for applying a pressure to orifices located within said second region in order to eject seeds located at such orifices into the transfer fluid flow; an elongated follower member slidably disposed within a groove in the housing which communicates with said fluid transfer passageway; and means for biasing the follower member into engagement with the peripheral surface of the disk, the follower member being formed to enter said shallow recesses in the peripheral surface so that it follows a contour of the peripheral surface and acts between the disk and the housing as a sliding seal for preventing transfer fluid from being carried on the peripheral surface of the disk to the seed suspension.

2. The apparatus of claim 1, wherein said transfer fluid passageway comprises a circumferentially extending groove formed in the housing surface within said second region.

3. The apparatus of claim 2, wherein said groove has a length of the order of one-fourth the circumference of the disk.

4. The apparatus of claim 1, wherein the second region at which said housing surface conforms closely to the peripheral surface extends approximately two-thirds of the circumference of the disk, and said first region extends approximately one-third of the circumference.

5. The apparatus of claim 4, wherein the housing has a circumferentially extending slotted opening therethrough at said first region to enable the flow of said fluid suspension of seeds past the peripheral surface of the disk.

6. The apparatus of claim 1 further comprising a pintle for rotatably supporting the disk, the pintle passing through a bore in the disk and the passageways in the disk communicating with the bore by ports, and wherein the suction applying means and the pressure applying means respectively comprise first and second circumferentially extending grooves located in the pintle so as to be in alignment with said ports, the first groove being in communication with a first passageway in the pintle which is in communication with a suction source, and the second groove being in communication with a second passageway in the pintle which is in communication with a pressure source.

7. The apparatus of claim 6, wherein said first groove is formed to apply suction to orifices located in both said first region and in a first portion of said second region, and said second groove is formed to apply pressure to orifices located in a second portion of said second region at which said transfer fluid passageway communicates with the peripheral surface of the disk.

8. The apparatus of claim 7, wherein said first pintle groove subtends an arc approximately equal to one-half the circumference of the disk, and said second pintle groove subtends another arc approximately equal to one-fourth of the circumference.

9. The apparatus of claim 1, wherein the elongated member is hollow and constitutes part of the transfer fluid passageway through the housing.

10. The apparatus of claim 1, further comprising means for varying the relative velocities of the transfer fluid flow and the peripheral surface of the disk to vary the distribution of seeds in the transfer fluid.

11. Apparatus for metering and dispensing seeds comprising a rotor adapted to be disposed within a fl;uid suspension of seeds, the rotor having a plurality of orifices spaced about a circumferentially extending peripheral surface thereof, each orifice being disposed in a concave shaped recess in the peripheral surface; means for rotating the rotor; means for applying a suction to orifices at a first portion of the rotor which is within the seed suspension to cause a seed to be drawn to and held on the peripheral surface at such orifices; a hollow follower member having an end biased into engagement with the peripheral surface at a second portion of the rotor, the end being formed to scoop seeds from the concave recesses; means for providing a flow of a transfer fluid at said second portion which contacts the peripheral surface of the rotor and flows outwardly from the rotor through the hollow follower member; and means for applying a pressure to orifices at said second portion to eject seeds at such orifices into the transfer fluid flow.

12. The apparatus of claim 1 further comprising a housing having a surface defining a housing recess, the rotor being rotatably disposed within the housing recess, and the housing recess being formed such that the housing surface conforms closely to a second part of the peripheral surface of the rotor and such that a first part of the peripheral surface is exposed to afford access to the seed suspension, the follower member being slidably disposed within a slot in the housing which communicates with said housing surface and is adjacent to the second portion of the rotor, and wherein said housing has a passageway therein which communicates with the housing recess and with the follower member for said transfer fluid flow.

13. The apparatus of claim 12, wherein said passageway comprises a circumferentially extending groove in the housing surface adjacent to the second portion of the rotor.

14. The apparatus of claim 12, wherein the follower member constitutes a sliding seal which acts between the peripheral surface of the rotor and the housing surface.

15. The apparatus of claim 12, wherein the rotor has a central bore which receives a pintle for rotatably supporting the rotor within the housing, each orifice communicating with the bore by a radial passageway in the rotor connected to the orifice and to a port in the bore, and wherein said suction applying means and said pressure applying means comprise, respectively, first and second circumferentially extending grooves in the pintle aligned with the ports, the first groove being in communication via passageways in the pintle with a suction source and the second groove being in communication via other passageways in the pintle with a pressure source.

16. The apparatus of claim 15, wherein the first groove is formed so as to apply a suction to orifices which are exposed to the seed suspension, and the second groove is formed to apply a pressure to orifices which are adjacent to the follower member.

17. The apparatus of claim 11, wherein the apparatus is adapted to be used with an automatic planting machine, and wherein said rotating means includes means for synchronizing the rotation of the rotor with respect to the speed of the planting machine over the ground.

18. The apparatus of claim 11 wherein the rotating means includes means for controlling the speed of rotation of the rotor relative to the velocity of the transfer fluid flow so as to control the dispensing of seeds into said transfer fluid.

* * * * *